United States Patent Office 3,521,581
Patented July 21, 1970

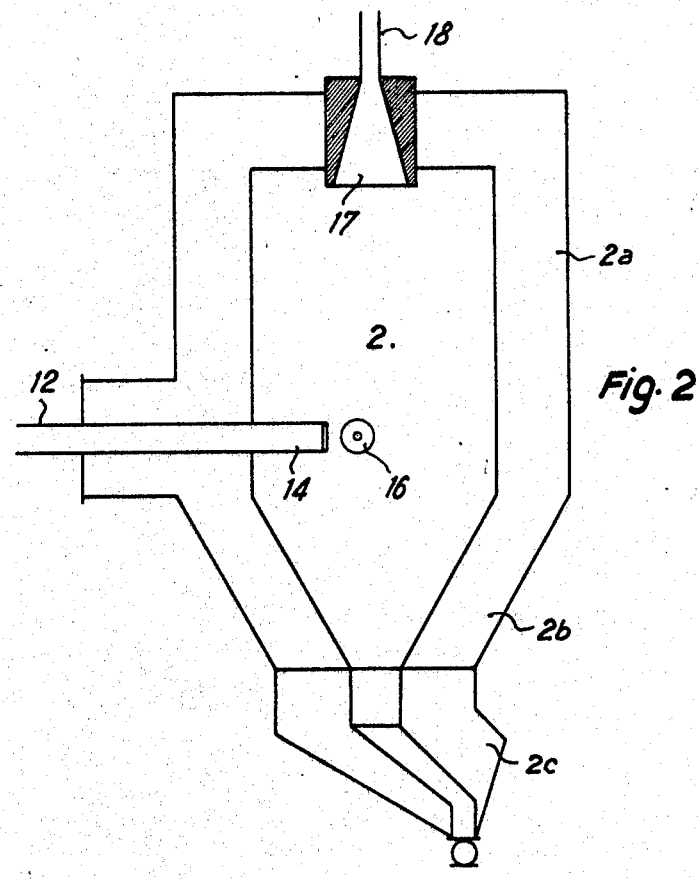
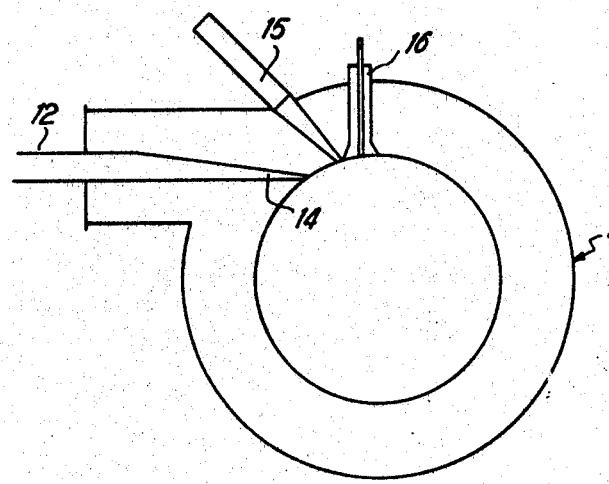

3,521,581
INSTALLATION FOR BURNING SEWAGE SLUDGES
Guy Quesnel, Gif, France, assignor to Stein & Roubaix, Paris, France, a French company
Filed Feb. 18, 1969, Ser. No. 800,149
Claims priority, application France, Feb. 23, 1968, 141,109
Int. Cl. F23g 5/04
U.S. Cl. 110—8       6 Claims

ABSTRACT OF THE DISCLOSURE

An installation for burning sewage sludges in a cyclone hearth includes a drier, the moist gases from which are mixed with the hot combustion gases from the cyclone hearth to effect deodorization. Part of the mixed gases are fed back to the inlet of the drier and the other part discharged to atmosphere through heat exchangers which warm the moist gases from the drier and the combustion air which blows the dried sludges to the cyclone furnace.

---

It is known that the sludges circulating in sewage collectors are mixed with a very considerable proportion of water, especially in works using decantation tanks. After decantation the sludges undergo a treatment which may be either a simple activation or a digestion. In all cases the sludges are finally centrifuged or filtered and concentrates are obtained containing a quantity of water between 75 and 85%. Although the volume of the sludges thus treated is considerably reduced relative to that of the sludges circulating in the sewer conduits, a problem is nevertheless posed.

One solution consists in putting the sludges into beds where the action of the wind and of the sun finally dries them so well that after a more or less long time relatively less moist sludges are obtained which are transportable and can be used eventually as fertilizers. However, this putting into beds is very expensive because of the land necessary, the cost being the higher the nearer to a town that the land is situated.

Total destruction of these sludges by combustion has been considered. The waste products resulting from the combustion must be of as small volume as possible, and in any case bacteriologically neutral.

It is indeed possible to dry the sludges without incinerating them. However, the gas that has served for drying generally leaves the installation at a relatively low temperature and contains elements that make them nauseous. Furthermore, the drying is expensive because it requires a very considerable quantity of heat having regard to the large quantity of water to be evaporated.

The invention has for object an installation that permits the performance of drying and incineration of the sludges with a deodorisation of the gases, giving residues that are bacteriologically neutral.

For this purpose, the installation comprises essentially a drier and a cyclone hearth, the latter serving to burn the sludges dried in the drier and giving combustion gases at high temperatures of the order of 1400 to 1600° C., a first circuit leading the moist gas from the drier to the outlet of the cyclone hearth where it mixes with the combustion gases from the hearth, a second circuit leading the said mixture to the inlet of the drier and having a length sufficient, taking into account the temperature of the mixture of gases for the latter to be deodorised at the inlet to the drier, and a third circuit taking off part of the deodorised gases at the inlet to the drier in order to discharge it to the atmosphere.

In a preferred practical form, the third circuit comprises a reheater traversed by the first circuit, for lowering the temperature of the gases intended to be discharged to the atmosphere, whilst reheating the moist gas from the drier before it is mixed with the exhaust gas from the cyclone furnace.

A second reheater may be provided in the third circuit for lowering further the temperature of the gases intended to be discharged to the atmosphere, whilst effecting preheating of the combustion air intended for the cyclone hearth.

The invention will be described in more detail with the aid of an example illustrated in the accompanying drawings, in which:

FIGS. 2 and 3 show in longitudinal section and cross section respectively a practical form of the cyclone hearth froming part of the installation according to FIG. 1.

Figure 1:
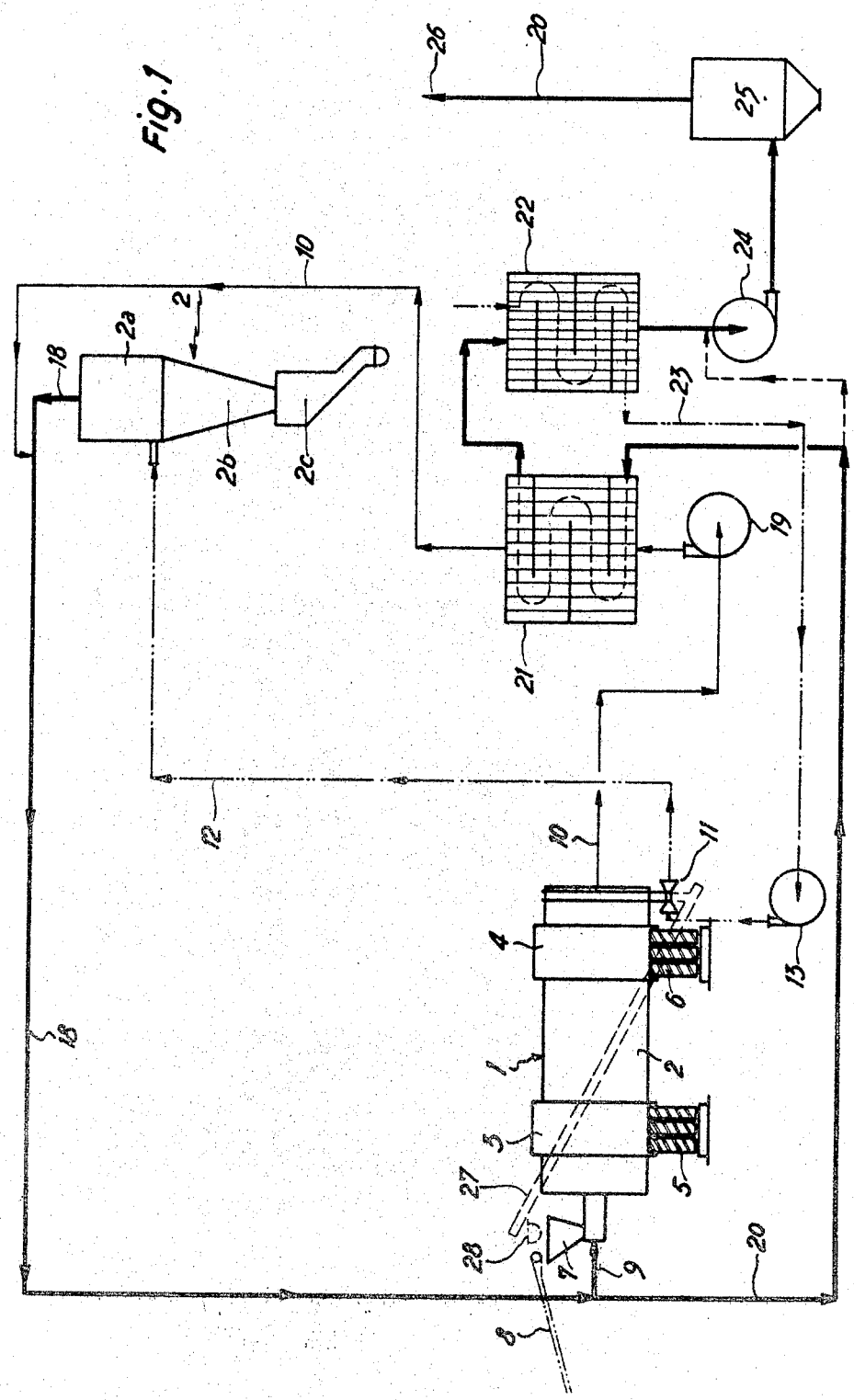
FIG. 1 is a diagram showing an installation according to the invention.

The installation illustrated in FIG. 1 comprises essentially a drier indicated in a general manner by 1, a cyclone hearth 2 and a certain number of circuits.

The drier 1, which may be of any convenient type is preferably, however, by reason of its lower cost, a rotary drier comprising a substantially horizontal cylindrical drum 2 equipped with rolling tracks 3, 4 in contact with sets of pneumatic tires 5, 6 which serve both to support the drier and to drive it in rotation. An apparatus of this type is described in the patent application filed by the applicants for "Improved Industrial Drier." The moist crude product is introduced into the hopper 7 by a suitable apparatus 8. The hot gases, which may for example be at a temperature between 700° and 800° C., are introduced into the apparatus at 9 to effect the drying of the product.

Further, the drying gases loaded with water vapour are evacuated via first circuit 10, whilst the dried product is evacuated at 11, being then introduced via a conduit 12 into the cyclone hearth 2. These dried sludges are conveyed at the same time as the combustion air introduced into the conduit 12 by a blower 13. They are in a pulverulent form.

The cyclone hearth 2 is illustrated in more detail in FIG. 2 and 3. It comprises a vertical cylindrical part 2a, extended at the lower part by a frusto-conical part 2b, itself connected to a recovery device 2c. The greater part of the heat contained in the sludges introduced via the base 14 connected to the conduit 12 is contained in the volatile materials, such that the sludges can be relatively easily set alight by means of a gas or oil pilot burner 15, 16.

By maintaining a high temperature in the cyclone hearth 2, there are obtained at the base 2b of the latter ashes in "liquid" form. These ashes are bacteriologically neutral owing to the very high temperature of combustion. They are also in a "vitrified" form, of a relatively high density that makes their handling easy. They are recovered by means of the device 2c.

The smoke is collected at the upper part of the apparatus at 17 and leaves via a second circuit 18 at a temperature which may be between 1400 and 1600° C. The first circuit 10, by means of a fan 19, leads the drying gases at the outlet of the cyclone hearth into the second circuit 18. The mixture of the drying gases with the gases at 1400–1600° C. from the cyclone brings the said drying gases to a temperature between 700 and 800° C. This second circuit 18 returns the said mixture to the inlet 9 of the drier 1 and is of a length sufficient for the nauseous gases to be at a temperature between 700 and 800° C. for a sufficiently long time.

In the closed circuit constituted by the drier 1, the circuit 10 and the circuit 18 are introduced the combustion gases from the cyclone hearth 2, and in consequence an equivalent quantity has to be withdrawn and sent to the atmosphere.

This quantity is taken off at the inlet 9 of the drier by a third circuit 20 which has the function of circulating the gases, the water vapour resulting from the drying and a certain quantity of air introduced into the preceding circuits. This third circuit is preferably also as long as possible prior to its evacuation to the atmosphere, so as to obtain a very considerable deodorisation.

Seeing that the gases circulating in the third circuit 20 are at a temperature between 600 and 700° C., it is preferable to recover the heat before rejecting them to the atmosphere.

According to a feature of the invention, there is installed in this third circuit 20 a first reheater 21 traversed also by the first circuit 10, in such manner that the temperature of the gases intended for the atmosphere is lowered whilst the drying gases in the first circuit 10 are reheated before reaching the outlet of the cyclone hearth 2 so as to be brought to about 700–800° C.

According to another feature of the invention, there is installed in the third circuit 20 a second reheater 22 also traversed by the conduit 23 through which the blower 13 draws the combustion air fed to the cyclone hearth by way of the conduit 12. The gases intended to be rejected to atmosphere are therefore cooled again to a temperature of the order of 200 to 250° C., whilst the combustion air is heated from the ambient temperature to a temperature of the order of 200° C., before passing through the blower 13.

Finally, the cooled gases are sent by a fan 24 into a dust removing installation 25 before being evacuated to the atmosphere at 26.

It goes without saying that the practical form described may receive numerous modifications without thereby exceeding the scope of the present invention. Thus, the cyclone hearth 2 may be disposed at a relatively long distance from the drier, since the path of the second circuit 18 must be sufficiently long. However, if the cyclone hearth 2 has to be installed in the vicinity of the drier 1 the sufficient length of path may be obtained by giving any desired form to the circuit 18.

Likewise, the dried sludges obtained at 11 may be recycled by means of a conveyor screw 27 which preferably leads the recycled products into a mixing screw 28 which also receives the moist crude product. The conditioning of the moist sludges mixed with the dried sludges improves the efficiency of the drier.

I claim:

1. An installation for drying and incinerating sewage sludges comprising a drier for drying the sludges, said drier having a first inlet for sludges, a second inlet for hot drying gas, a first outlet for dried sludges, and a second outlet for moisture-bearing gas, a cyclone hearth for burning the dried sludges at high temperature and generating high temperature combustion gases, a first conduit means leading gas from the second outlet of the drier to mix with combustion gases from the cyclone hearth, a second conduit means conveying said mixed gases to said second inlet of said drier, said second conduit means being of a length to ensure substantial deodorisation of the gases on reaching the said second inlet, and third conduit means branching from said second conduit means to convey a part of said deodorized mixed gases to atmosphere.

2. An installation as claimed in claim 1, wherein the third conduit means comprises a reheater traversed by said first conduit means whereby the temperature of said part of said gases is lowered before discharge to the atmosphere and the gases from the drier are reheated before being mixed with the combustion gases from the cyclone.

3. An installation as claimed in claim 1, comprising means for conveying said dried sludges from said first outlet of said drier to said cyclone hearth, said conveying means comprising means for generating a flow of combustion air to entrain said dried sludges.

4. An installation as claimed in claim 3, wherein said third conduit means comprises a preheater for said combustion air.

5. An installation as claimed in claim 1, wherein said drier comprises a substantially horizontally cylindrical drum and pneumatic tires supporting and driving said drum.

6. An installation as claimed in claim 1, including means for recycling the dried sludges and mixing them with the moist sludges before they enter the drier.

References Cited

UNITED STATES PATENTS

| | | | |
|---|---|---|---|
| 2,171,535 | 9/1939 | Berg et al. | 110—14 XR |
| 2,148,447 | 2/1939 | Dundas et al. | 110—15 |

KENNETH W. SPRAGUE, Primary Examiner

U.S. Cl. X.R.

110—15